Jan. 26, 1932.  W. A. HEYMAN  1,842,969
PACKAGING LIQUIDS
Filed Nov. 9, 1929  3 Sheets-Sheet 1
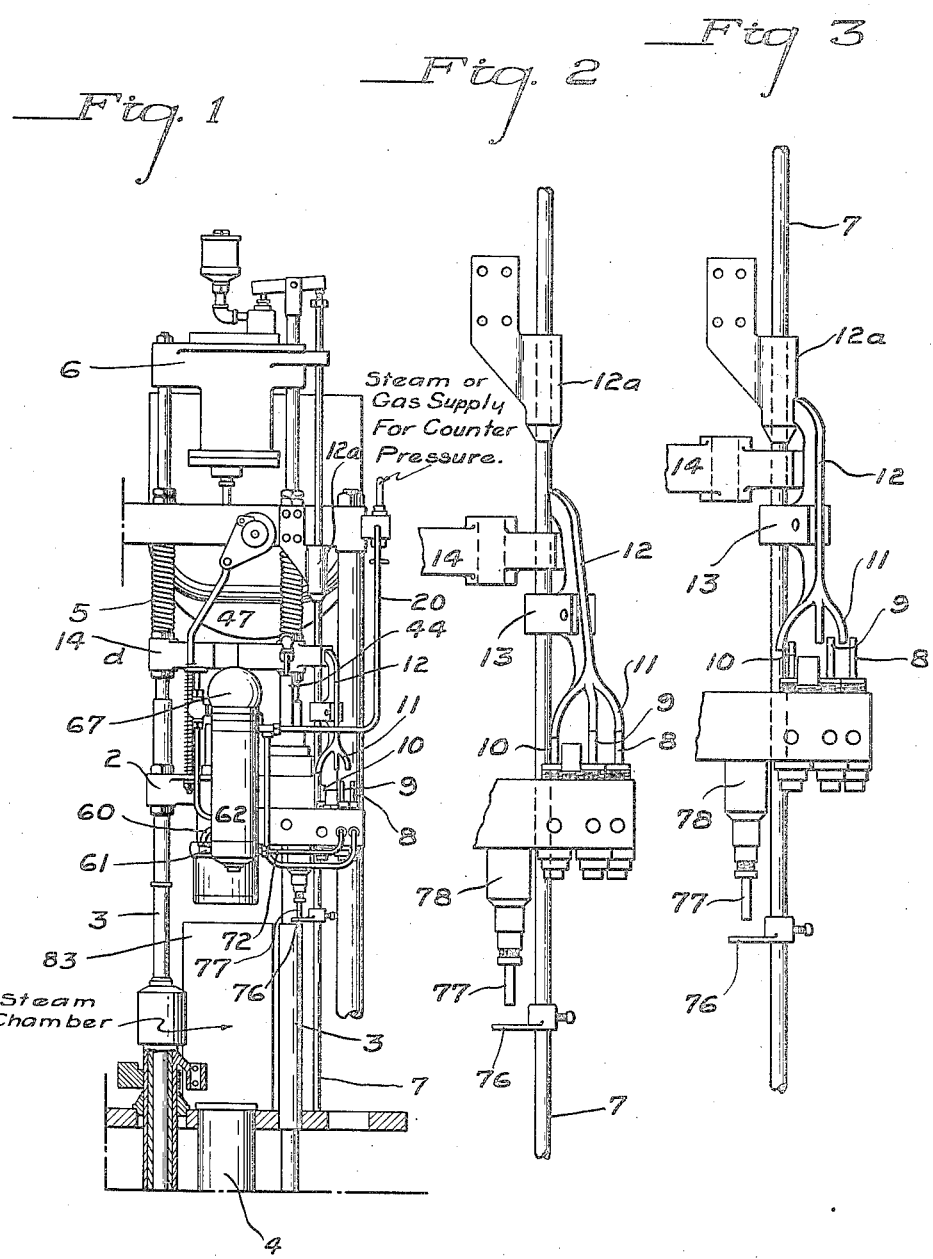

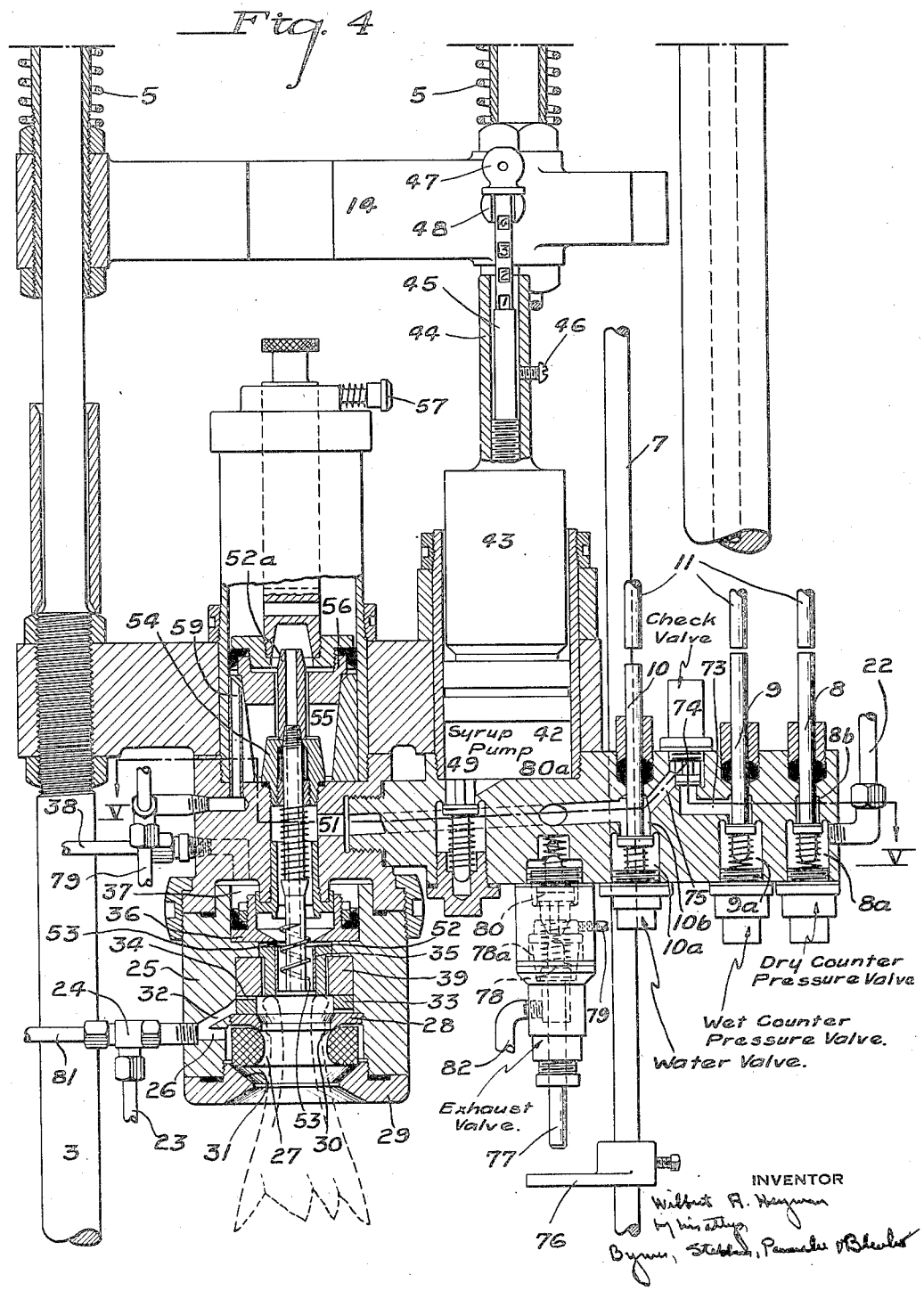

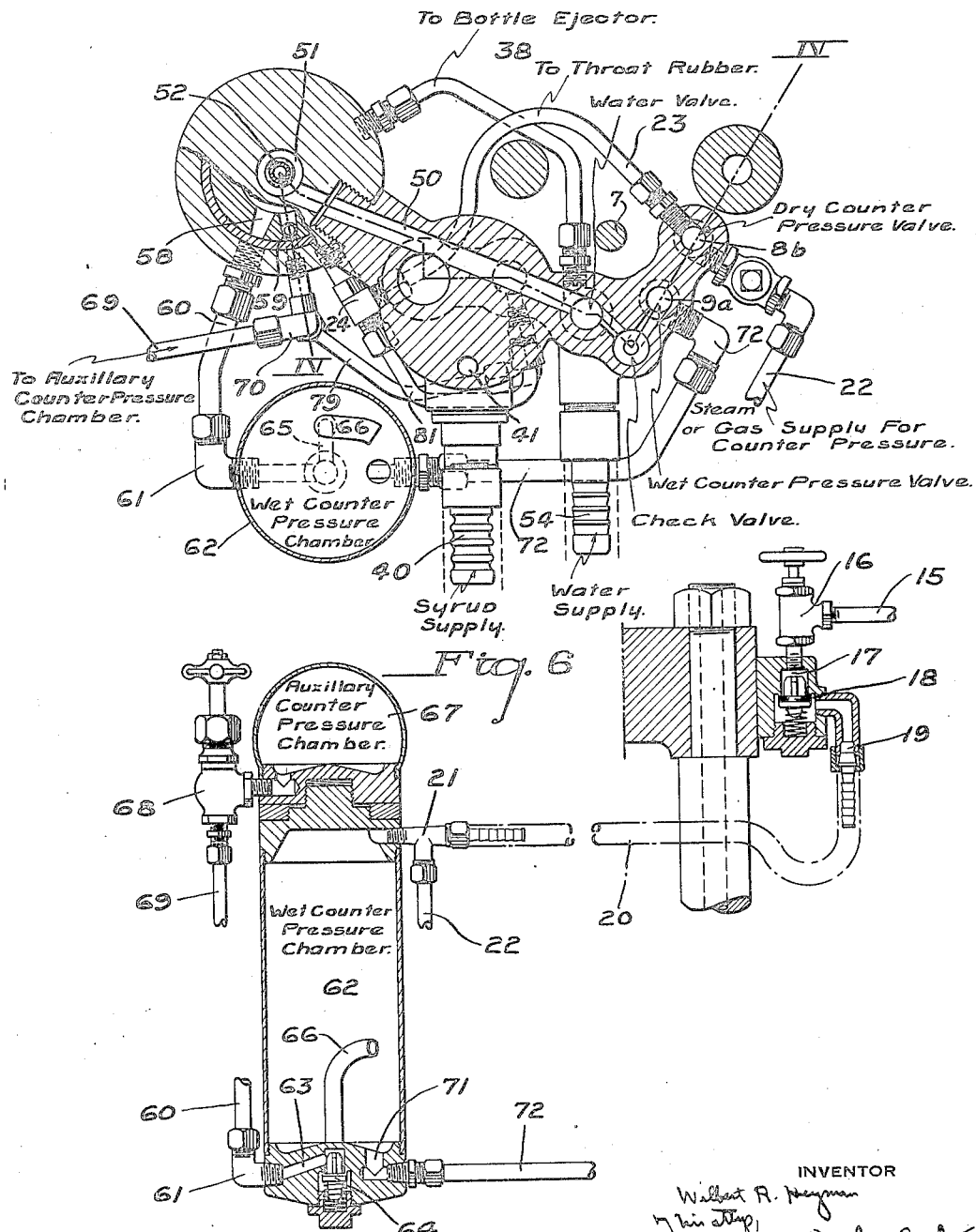

Patented Jan. 26, 1932

1,842,969

UNITED STATES PATENT OFFICE

WILBERT A. HEYMAN, OF NEW YORK, N. Y.

PACKAGING LIQUIDS

Application filed November 9, 1929. Serial No. 406,041.

This invention relates to an improved process for packaging liquids, and more particularly to the packaging of fermentable liquids under sterile conditions.

This invention is particularly adapted for the packaging of milk and other beverages, such as fruit juice beverages or chocolate milk beverages which are susceptible to fermentation and require absolute sterilization to avoid spoiling of the beverage during storage.

It has been customary in the beer and fruit juice industry to sterilize the bottles and their contents after they have been filled with carbonated beverages. In the filling of containers with milk, it is customary to fill the containers with milk while both the container and milk are cold, after which the container with the milk is raised to a sterilizing temperature and held there for a considerable length of time. Both of these methods are cumbersome and require considerable equipment and necessitate additional handling of the packages, which is expensive.

In the bottling of chocolate drinks and milk beverages, it has been customary to sterilize the bottles, after which the bottles are filled with the cold beverage by an ordinary filling machine. After filling, the bottled product had to be pasteurized in an entirely separate machine, necessitating a separate handling of the bottles and additional expensive equipment.

I obviate the difficulties attending the foregoing processes, reducing the number of steps required, and dispensing with expensive equipment heretofore required, and reducing the handling of the packages to a minimum.

According to my process, a complete sterilization of the container and its contents is effected with a minimum amount of equipment and handling; contamination of the beverage after the filling of the package is obviated; sterilization is effected with a minimum expenditure of heat.

In the accompanying drawings, there is shown a liquid packaging machine which is well suited to my process, although the machine per se forms no part of my invention, being the invention of Patrick W. Shields. By the use of this machine the sterile beverage may be conveniently packaged according to my improved process and suitable conditions are maintained throughout the packaging for the successful carrying out of the process. It will be understood, however, that my invention may be practiced with various types of filling machines and the machine described is by way of illustration only.

In carrying out my process, I prefer to sterilize the beverage and package the same under such conditions that the container is rendered sterile or maintained sterile out of contact with the atmosphere, and the packaging process is carried on at a pressure equal to or greater than the vapor pressure of the liquid at the temperature at which packaging is effected.

In the drawings:

Figure 1 is a front elevation, partly broken away, of a filling machine;

Figures 2 and 3 are views to an enlarged scale, showing the valve actuating lever in different positions;

Figure 4 is a developed sectional view showing various connections in the filling head. This view is taken on the line IV—IV of Figure 5.

Figure 5 is a horizontal section partly broken away, taken on the line V—V of Figure 4; and Figure 6 is a diagrammatic view illustrating the pressure connections.

The filling machine comprises a head, indicated generally by the reference character 2, slidably mounted on vertically extending rods 3. The head is adapted to be lifted by a bottle which may be carried upwardly by a plunger 4. The normal lift of the head is a distance $d$ (Figure 1) although springs 5 permit additional movement to accommodate bottles of different size. The head is provided with an oil cylinder 6 for the purpose of locking the filling head in an elevated position. The oil cylinder valve is actuated by a push rod 7 connected to a cam (not shown). The valve rod 7 is also effective for operating inlet and associated valves of the filling head.

The head is provided with three inlet valves 8, 9 and 10, hereinafter referred to as the dry counter pressure valve, the wet counter pressure valve, and the water valve, respectively. The valves each have stems adapted to be engaged by prongs 11 on a valve actuating lever 12. The actuating lever is pivotally mounted in a block 13 fastened on the rod 7. When the head is in its low position, the upper arm of the valve lever 12 is engaged by a cross member 14, and the prongs 11 are thus held out of alignment with the valve stems. When the head is lifted, the lever 12 is lifted to a position corresponding to that of Figure 2, so that downward movement of the valve rod 7 is effective for actuating the valves. This arrangement prevents opening of any of the valves in the event that no bottle is supplied to the machine.

A guide 12ᵃ is secured to the frame of the machine so as to lie above the upper end of the lever 12. When ever a bottle gets under the head but does not enter the opening provided therein for the bottle, the head is lifted and permits opening of the valves. The lifting, however, is in excess of the normal lift so the lever 12 is engaged by the guide 12ᵃ, thus forcing the lever 12 to the position of Figure 3. The opening of the valves, as at the most, will be only temporary.

The so called dry counter pressure is effective for actuating the throat rubber and for increasing the pressure in the space thereabove to a substantial pressure above atmosphere. Pressure is supplied from a suitable source, such as a carbonator, through a conduit 15 terminating in a needle valve 16. The needle valve is connected with a valve chamber 17, provided with a spring pressed valve 18. The pressure of the spring valve supplies a wire drawing action so that when gas is drawn through the valve 18 its pressure is reduced by a small amount. In this way the amount of pressure in the dry counter pressure system is limited.

The space below the valve 18 is connected through an elbow fitting 19 to a flexible conduit 20 terminating in a T fitting 21. One branch of the T fitting is connected to a conduit 22 terminating in the chamber 8ᵃ of the dry counter pressure valve 8. When the dry counter pressure valve is open the gas is free to pass to the chamber 8ᵇ of the valve and thence through a conduit 23 to a T fitting 24. The T fitting is screwed into the barrel portion 25 of the filling head and is connected to a passage 26 therein. This passage terminates behind the throat rubber 27 and when the valve is opened, the gas pressure is effective for causing the throat rubber to move inwardly and engage the neck of a bottle in the head.

The throat rubber 27 lies between a top guide 28 and a bottom guide 29. The top guide 28 has a downwardly turned internal flange 30 and the top face 31 of the bottom guide 29 is also inclined downwardly. Because of this construction the throat rubber is given an axial component when the valve 18 is open. In other words, its inner portions move inwardly and downwardly so that the combined movement is such that a pressure more nearly perpendicular to the surface of the bottle is applied.

The passage 26 is provided with a branch 32 leading to the space above the throat rubber guide 28. The barrel 25 is provided with a washer 33 immediately above the top guide 28, this washer being slotted radially, as indicated at 34, to admit the gas to the space inside the washer.

When a bottle is inserted in the head, as indicated in chain lines in Figure 4, the lip around the bottle opening engages the lower surface of a bottle ejector 35. This bottle ejector is normally urged downwardly by an ejector plunger 36. The barrel 25 has a fluid space 37 formed therein immediately above the ejector plunger 38, and this chamber always contains liquid under full pressure from the pressure source, such as a carbonator supplied through a conduit 38. The head contains a crowning die 39 and the washer 33 is slotted for the insertion of a crown by a suitable mechanism. The dry counter pressure is therefore effective for sealing the bottle in the head and surrounding the space outside the bottle, but above the throat rubber, with gas under pressure. Although the wet counter pressure valve is actuated before the water valve is in actual operation, the water and syrup supply system will next be described for the sake of clarity. The sequential operation of the valves is secured by varying the spacing of the valve stems from the prongs 11 (Figure 4). The syrup is supplied through a hose terminating in a connection 40, past an inlet valve, not shown, and through a conduit 41 to the cylinder 42 of a syrup pump. The syrup pump has a piston 43 having an interiorly threaded extension 44. The piston rod 45 is threaded into the extension 44 and may be held in any desired position by a set screw 46. The rod 45 has a head 47. It is embraced by a fork 48 on the cross bar 14. When the head moves downwardly after the bottle has been filled, the fork engages the head 47 and pulls the piston 43 upwardly in the cylinder 42, thus effecting a suction stroke. When the head is lifted by a succeeding bottle the fork 48 engages the upper end of the extension 44 and thus effects a downward stroke of the piston 43. On this stroke, the syrup is forced past an outlet valve 49 into a passage 50. The passage 50 terminates in a central opening 51 in the filling head proper. A filling tube 52 extending downwardly into this opening is provided with a helical rib 53. The syrup (and later in the filling operation, the water) travels downwardly in the annulus in the filling tube and the wall of the chamber 51. The helical rib 53 imparts a swirling motion to the liquids and causes them to travel in a generally helical path adjacent the bottle wall during the filling step. It will be understood, of course, that when the filling operation is in progress the bottle ejector 35 is in elevated position so that the filling tube 52 extends into the bottle. The amount of syrup supplied is determined by the amount of lost motion of the fork 48 between the head 47 and the top of the extension 44. The operation is effected by throwing the rod 45 into and out of the extension 44.

Water is supplied from the carbonator or other suitable pressure source through a flexible hose terminating in a connection 54 leading to a chamber 10$^a$ of the water valve 10. When the valve 10 is open, the water is free to pass to the chamber 10$^b$ of the valve and thence to the conduit 50. The amount of water supplied to the bottle is controlled by the length of time the valve 10 remains open, and by the back pressure built up during filling.

During the filling operation the air and gas are displaced from the bottle. The filling tube 52 is made hollow to permit air and gas passing off. The filling tube extends upwardly through a packing 54 which isolates the chamber 51 from a chamber 55. The filling tube 52 is provided with an extension 52$^a$ above this packing. The chamber 55 is provided with an adjustable piston 56 whose position is controlled by a pin 57. In this manner the volume of the chamber may be varied as desired. During the filling, the displaced gases build up a back pressure which affects the filling rate and therefore the quantity of water supplied, for a given length of time, in which the valve 10 is maintained open.

During the filling operation, despite the action of the helical rib 53, there is always some foaming in the bottle when a carbonated beverage is being bottled, and as a result the displaced gases rushing upwardly through the opening in the filling tube 52 carry with them a certain amount of foam and liquid. The foam and liquid are carried upwardly through the extension 52$^a$ and then flow downwardly to collect in the bottom of the chamber 55. The chamber 55 is provided with two outlets, one of which, numbered 58, terminates in the floor of the chamber (Figure 5) while the other terminates in a stand pipe 59. The opening 58 communicates with a conduit 60 terminating in a fitting 61 at the bottom of a wet counter pressure chamber 62. The fitting 61 leads to a conduit 63 terminating in the chamber of a check valve 64. The liquid in the chamber 55 flows by gravity through the conduit 60 and when sufficient pressure is built up in the chamber 55, the check valve 64 is forced open, whereupon the collected liquid and the gas pass through a conduit 65 (Figure 5) terminating in a stand pipe 66 within the wet counter pressure chamber 62. This operation continues substantially throughout the filling of the bottle. The wet counter pressure chamber 62 is in communication with the carbonator or similar source of pressure through the conduit 20 and the fitting 21. Because of the wire drawing action of the valve 18, the pressure in the wet counter pressure chamber will be below that of the carbonator or other pressure source, and may vary somewhat during filling, due to the supplying of displaced gas and air from the bottle.

The chambers 55 and 62 combine to give the total desired volume for determining the back pressure which is built up by displaced gas and air.

In filling large bottles, it is sometimes desirable to increase the combined volume of the chambers 55 and 62 more than is possible by mere adjustment of the piston 56. This may be done by connecting into the system an auxiliary counter pressure chamber 67. The auxiliary counter pressure chamber is connected through an end valve 68 to a conduit 69 terminating in a fitting 70, one branch of which communicates with the stand pipe 59. The stand pipe prevents water from entering the fitting 70 and therefore there is no danger of any water or foam being carried into the auxiliary counter pressure chamber 67.

The wet counter pressure chamber 62 has an opening 71 at the bottom, communicating with a conduit 72. The conduit 72 terminates in the chamber 9$^a$ of the wet counter pressure valve 9 (Figure 5).

Assuming that a bottle has been filled and removed from the head, it will be seen that the pressure is locked in the wet counter pressure chamber 62 by the check valve 64 and the wet counter pressure valve 9. The connections to the fitting 21 are not considered because the valve 18 acts as a check and the valve 8, connected to the conduit 22 is closed. The pressure in the filling head proper, the conduit 50 and the chamber 55 will, of course, be atmospheric.

Assuming that a bottle is placed in the head and the valves 8 and 9 are opened, the valve 8 will operate to actuate the throat rubber and seal the bottle in the valve, and also to build up pressure in the space within the head, but outside the bottle. There will be no material diminution in pressure in the chamber 62 because only a small amount of gas is required for operation of the throat rubber, but in any event the deficiency will be made up immediately by the carbonator, or other pressure source, through the valve 18.

Upon opening the valve 9 the pressure in the wet counter pressure chamber 62 will be released. The collected water in the chamber will be forced through the conduit 72, past the valve 9, into a conduit 73, past a check valve 74 and to a conduit 75 terminating in the chamber 10$^b$ from which it is free to pass through the conduit 50 to the bottle. The liquid collected during the filling of one bottle is therefore discharged into a succeeding bottle, and the pressure within the wet counter pressure chamber will be effective for building up an initial counter pressure in the bottle, which pressure will be below the carbonator pressure in an amount depending upon the wire drawing action of the valve 18. Of course, a regulator may be used in the conduit 15 in place of the valve 18.

With the counter pressure thus established in the bottle, the filling operation proceeds as described. The filling operation is terminated by an upward movement of the valve rod 7, which is effective for closing the valves 8, 9 and 10. The bottle is crowned while still in the head by a suitable mechanism and the bottle is then ready to be removed from the head. The exhaust valves are controlled by a foot 76 on the valve rod 7. The upward movement of the valve rod 7 for closing the valves 8, 9, and 10, is continued after the capping has been effected, thereby bringing the foot 76 into engagement with the stem 77 of an exhaust valve 78. The opening of the valve 78 is effective for releasing the pressure in chamber 55. The valve chamber 78$^a$ is connected through a conduit 79 to a fitting 70, and thence through the stand pipe 59 to the chamber 55. Only gas and air will be exhausted since the liquid in the chamber 55 will have been taken off through a conduit 60, and in any event, is prevented from escaping through the conduit 79 because of the stand pipe 59. The upper end of the valve 78 is adapted to engage the bottom of a second exhaust valve 80 and to open the same shortly after the opening of the valve 78. The opening of the exhaust valve 80 is effective for releasing the pressure behind the throat rubber. The chamber 80$^a$ of this valve is connected through a conduit 81 to the fitting 24 and thence to the conduits 26 and 32. The gases which are thus released pass off through the exhaust conduit 82.

My improved process contemplates the use of the above described mechanism in the packaging of fermentable beverages of the milk shake type by the provision of a steam kettle connected to the conduit 15 through which the liquid at sterilizing temperature is fed to the bottling machine. The bottles are previously washed clean and may be rendered sterile by blowing steam into them so as to drive out the air and heat the bottles to the temperature of the liquid. The bottles are then fed into the filling head and are sealed therein, after which the hot liquid is fed into the bottles at a pressure equal to or greater than the vapor pressure of the liquid at the sterilizing temperature employed so that the liquid cannot flash into steam. While maintained under this pressure the bottle is crowned and may then be removed from the head. If desired, the bottles and crowns may be further rendered sterile by passing them on a conveyor through a steam chamber 83 where they are subjected to a sterilizing temperature for some time after filling. This treatment may also serve to cool the bottles slowly and prevent breakage.

My invention also contemplates the use of the syrup pump, as above described, the syrup being heated before being supplied to the machine, after which sterilized water, at a high temperature and pressure is fed into the bottle, and sealed in the filling head, whereby the interior of the bottle is rendered sterile and the beverage is packaged in such condition that subsequent fermentation is obviated.

I have discovered that fruit juices may be sterilized without the destruction of vitamine "C" if the liquids are subjected to gas pressure during the sterilization since the pressure of the gas lowers the necessary temperature required to effect sterilization. In such a case, I propose to render the juices sterile by heating under pressure and bottling under substantially the same pressure. The latter operation may advantageously be carried out in conjunction with carbon dioxide, which is used to effect the necessary pressure during sterilization. The fruit juice is charged into the bottle at a sterilizing temperature under a suitable pressure and carbon dioxide is fed into the bottle through the mechanism described and the bottle is sealed with the hot liquid having a carbon dioxide atmosphere thereover. After the liquid becomes cool, it will absorb the carbon dioxide and become carbonated to some extent.

In order to bring the milk beverage or milk itself to a sterilizing temperature, I have found it desirable to degasify the milk so as to remove substantially all the oxygen therefrom. This is preferably done by placing the liquid under a vacuum and boiling the same for a short period of time to expel the dissolved air and displace the air in a container with vapors. The vacuum is then broken with an inert gas, such as carbon dioxide or nitrogen and a slight super-atmospheric pressure is placed over the liquid to insure that all of the vacuum is replaced by the gas. The liquid is again placed under a high vacuum and allowed to boil a second time for a short period of time and the vacuum is again broken with the inert gas, after which the liquid is placed under a super-atmospheric pressure of an inert gas. The air being all displaced, it is now safe to raise the temperature of the liquid to the sterilizing temperature, which, in the case of milk, ranges from 230° F. to 240° F., depending upon the pH value, and the time of holding this temperature ranges from fifteen to thirty minutes.

It has been customary to take this sterilized milk and lower the temperature to a point below the ebullition temperature so that containers could be filled without losing any of the vapors and without substantial change in flavor or destruction of the vitamins by contact with oxygen. This process was objectionable because it was difficult to keep the container, as well as the air surrounding the container, absolutely sterile. The commercial packaging of the sterile milk was practically impossible, if an absolutely sterile product was to be had after the containers were sealed, unless the containers were subsequently heated to a sterilizing temperature again. Using the filling machine described, I provide a process wherein the containers are washed and heated to substantially the same temperature as the maximum temperature of the product to be filled therein; a jet of live steam may be forced into the bottle when the valve 8 opens, at first escaping into the chamber 62 to displace all of the air in the bottle, the outlet then closing automatically so that the bottle is placed under a steam pressure which is preferably the pressure corresponding to the temperature of the liquid to be placed therein. A valve 10 is then opened and the liquid is forced into the bottle against the counter-pressure within the bottle, after which the bottle is capped while the pressure is maintained substantially constant. The temperature of the bottle and contents is then at least the temperature required for sterilization and the heat thereof will completely sterilize the inner parts of the container without possibility of any change of flavor or destruction of vitamins by oxidation. The advantages of a machine in which the bottle may be sealed in a filling head and the liquid may be kept out of contact with the atmosphere will be readily appreciated and for that reason the filling machine hereinbefore described has proved well adapted for carrying out my process. If the hot liquid contains a high proportion of milk the injection of the liquid through a fine opening and across the helical rib 53 effectually breaks up any curds present due to the action of the heat of the milk.

The foregoing process may, of course, be supplemented by maintaining the bottles and their contents at the temperature of filling for a period of time as they pass through a heated chamber on a conveyor, such as the steam chamber 83.

I have found in some cases that it is desirable to replace the steam with an inert gas, such as nitrogen or carbon dioxide, the gas being used to displace the air in the bottle before pressure is produced within the bottle. I have found that if carbon dioxide is desired to give a finished product a carbonated tang, as is sometimes desired in drinks of the chocolate milk type, the addition of the carbon-dioxide to the product while cold and the subsequent solution of the gas in the beverage causes coagulation of the colloids upon the application of heat, but if the gas is placed in the bottle over the hot beverage, this coagulation will not occur. In the case of certain fruit juices, the same is true, and it is desirable to place the gas in the container or bottle after the finished drink is in the bottle in preference to carbonating the water or the finished drink prior to bottling. By forcing carbon dioxide into the bottle in the manner described, the machinery and labor for carbonating the liquid is eliminated.

The sterilizing temperature for acid fruit juices is below the normal boiling point and consequently no super-atmospheric pressure is required to maintain the temperature while filling, but in emptying the bottle of the air contained therein and in injecting insufficient carbon dioxide into the container so that the cooled contents will absorb sufficient carbon dioxide to give the drink the desired tang, pressure is required. I have found that the addition of carbonic acid gas increases the hydrogen ion concentration and permits the use of a lower temperature for a shorter time to attain sterility, thereby giving a better flavored product with a minimum destruction of certain of the vitamins.

By the method just described the liquid going into the bottle is substantially free of air and is raised to the sterilizing temperature; the liquid is placed into the container or bottle after the container has been freed of air, and is then maintained under a pressure of carbon dioxide. The pressure of the carbon dioxide is such that when the product is cooled, it will absorb the gas and become carbonated. The container is preferably hot at the time of filling so that the heated liquid is not cooled below the sterilizing temperature upon contact with the bottle and the inner parts of the bottle and the caps are therefore sterilized by the liquid. I thus obviate the previous carbonation step which has been used heretofore, and render the subsequent sterilization of the bottle and contents unnecessary, although the hot bottles and product may be passed through a heated zone to maintain the sterilizing temperature for some time if the particular product is very difficult to sterilize.

It is not necessary to fill the bottle with the gas before filling with the hot liquid. In those cases where the products are bottled below the boiling temperature as the hot liquid will displace the air without dissolving any or being acted upon thereby, and the air remaining in the bottle may be displaced by the gas before the contents of the bottle are finally placed under pressure of the gas.

As a specific example of the use of a filling machine described, I may connect a kettle having combined water and chocolate milk syrup to the conduit 15 of the machine, the water and chocolate milk syrup being heated in the absence of air and in the presence of an inert gas, such as nitrogen. The heating of the contents of the kettle having been carried on for a length of time sufficient to secure sterilization, the bottles which have been previously cleaned are sealed in the filling head under approximately the same temperature and pressure as the contents of the kettle, the reduction in pressure being simply the loss in wire drawing by the valve 18. The bottles are then filled with the liquid, against the counter-pressure before described, and crowned while maintaining the pressure. The sterilizing temperature of the liquid is effective for sterilizing the caps and the interior of the bottles, although the filled bottles may be maintained at a sterilizing temperature for some time after filling if this is made necessary by the loss of heat during filling.

I may also use the syrup pump 42 to inject a desired syrup into the bottle after which water at a sufficiently high temperature to effect sterilization may be fed from a heating container through the conduit 15 and various valves to the bottle. By carefully maintaining a suitable temperature of the water, complete sterilization may be readily effected.

It will be understood that the term "bottle" as used herein is used as a term of general definition for a container rather than a limitation to a specific type of the package.

While I have illustrated and described certain preferred embodiments of my invention, it will be understood that the invention is not limited thereto, but may be otherwise practiced and embodied within the scope of the following claims.

I claim:

1. In the method of packaging fermentable liquids, the steps consisting in establishing an inert atmosphere within a heated container to be filled, supplying hot liquid at a sterilizing temperature through an air excluding conduit to the heated container, and sealing the container while maintaining a pressure on the contents of the bottle at least equal to the vapor pressure of the liquid at the filling temperature.

2. In the method of packaging fermentable liquids, the steps consisting of filling a container with the liquid at a sterilizing temperature, forcing carbon dioxide into the container and sealing the container while maintaining the carbon dioxide under super-atmospheric pressure.

3. In the method of packaging fermentable liquids, the steps consisting in subjecting the liquid to the pressure of an inert gas, maintaining the liquid at an elevated temperature for sufficient time to secure sterilization, and packaging the liquid under substantially the same temperature and pressure.

4. In the method of packaging fermentable liquids, the steps consisting in subjecting the liquids to the pressure of an inert gas, maintaining the liquid at an elevated temperature for sufficient time to secure sterilization thereof, supplying the sterile liquid at a sterilizing temperature to a heated container, and sealing the container at a sterilizing temperature while maintaining a pressure substantially equal to or greater than the vapor pressure of the liquid at the filling temperature.

5. In the method of packaging fermentable beverages, the steps consisting in heating a container to be filled, sealing the container from the atmosphere, supplying a flavoring syrup to the container, supplying to the container a liquid at an elevated temperature sufficient to effect sterilization, and sealing the container while excluding the atmosphere and maintaining a pressure substantially equal to the vapor pressure of the liquid at filling temperature.

6. In the method of packaging fermentable beverages, the steps consisting in sealing a heated container from the atmosphere, supplying a hot flavoring syrup to the container, supplying to the container a hot liquid at a sterilizing temperature while excluding the atmosphere, forcing carbon dioxide into the container at a super-atmospheric pressure and sealing the container while maintaining a pressure substantially constant.

7. In the process of packaging fermentable beverages, the steps consisting in subjecting the beverage to the pressure of an inert gas, maintaining the beverage at an elevated temperature for sufficient time to secure sterilization thereof, establishing an inert atmosphere in a heated container to be filled, supplying the beverage to the container at a sterilizing temperature under non-oxidizing conditions, subjecting the liquid in the container to a super-atmospheric pressure of carbon dioxide and sealing the container while maintaining substantially constant pressure.

8. In the method of packaging fermentable beverages, the steps consisting in degasifying the beverage at an elevated temperature under reduced pressure, subjecting the beverage to the pressure of an inert gas at super-atmospheric pressure, maintaining the beverage at an elevated temperature for a sufficient time to effect sterilization, and supplying the beverage at a sterilizing temperature through an air excluding conduit to a container to be filled while maintaining a pressure substantially equal to or greater than the vapor pressure of the beverage at said temperature.

9. In the method of packaging fermentable liquids, the steps consisting in degasifying the liquid at an elevated temperature under reduced pressure, subjecting the liquid to the pressure of an inert gas, heating the liquid at a sub-atmospheric pressure, subjecting the liquid to a super-atmospheric pressure of an inert gas, sterilizing the liquid by heating at an elevated temperature for a sufficient length of time to effect sterilization, and supplying the liquid through an air excluding conduit to a heated container, the liquid being at sufficient temperature to effect sterilization of the container.

10. In the method of packaging fermentable liquids, the steps consisting in degasifying the liquid at an elevated temperature under reduced pressure, subjecting the liquid to the pressure of an inert gas, heating the liquid at a sub-atmospheric pressure, subjecting the liquid to a super-atmospheric pressure of an inert gas, sterilizing the liquid by heating at an elevated temperature for a sufficient length of time to effect sterilization, supplying the liquid through an air excluding conduit to a heated container, the liquid being at a sufficient temperature to effect sterilization of the container, and sealing the container while maintaining a pressure on the liquid substantially equal to or greater than the vapor pressure of the liquid at the time of sealing.

11. In the method of packaging fermentable liquids, the steps consisting in sterilizing the liquid by heating at an elevated temperature and pressure, sealing a container in a filling head, supplying the liquid to the container through an air excluding conduit at pressure substantially equal to or greater than the vapor pressure of the hot liquid during filling, and crowning the container while maintaining the pressure on the liquid substantially undiminished.

12. In the method of packaging fermentable liquids, the steps consisting in heating the liquid to a sterilizing temperature, sealing a container in a filling head to the exclusion of the atmosphere, supplying the liquid to the container through an air excluding conduit at a temperature sufficient to effect sterilization of the container, and crowning the container while sealed in the filling head, the liquid being at all times subjected to a pressure substantially equal to or greater than the vapor pressure of the liquid at all times during the packaging operation.

13. In the method of packaging fermentable liquids, the steps consisting in heating a container to be filled, sealing the container within a filling head to the exclusion of the atmosphere, supplying a hot flavoring syrup to the container, supplying the hot liquid through an air excluding conduit to the container at a temperature sufficient to effect sterilization of the liquid and the container, forcing carbon dioxide into the container at a super-atmospheric pressure, and crowning the container while sealed in the filling head, the pressure to which the liquid is subjected throughout the packaging operation being maintained substantially equal to or greater than the vapor pressure of the liquid at any time during the packaging operation.

In testimony whereof I have hereunto set my hand.

WILBERT A. HEYMAN.